(12) United States Patent
Pizzagalli

(10) Patent No.: US 8,498,780 B2
(45) Date of Patent: Jul. 30, 2013

(54) ROAD VEHICLE CRASH CONTROL METHOD, AND ROAD VEHICLE IMPLEMENTING SUCH A CONTROL METHOD

(75) Inventor: Veniero Pizzagalli, Serramazzoni (IT)

(73) Assignee: Ferrari S.p.a., Mondena (IT)

( * ) Notice: Subject to any disclaimer, the term of this patent is extended or adjusted under 35 U.S.C. 154(b) by 134 days.

(21) Appl. No.: 13/155,192

(22) Filed: Jun. 7, 2011

(65) Prior Publication Data
US 2011/0301812 A1 Dec. 8, 2011

(30) Foreign Application Priority Data

Jun. 7, 2010 (IT) .............................. BO2010A0351

(51) Int. Cl.
*B60G 17/016* (2006.01)
(52) U.S. Cl.
USPC .......... 701/37; 280/5.514; 280/5.503; 180/41
(58) Field of Classification Search
USPC ......................................................... 701/37
See application file for complete search history.

(56) References Cited

U.S. PATENT DOCUMENTS

| 6,993,422 B2 * | 1/2006 | De Mersseman et al. ...... 701/37 |
| 2002/0156561 A1 * | 10/2002 | DeBoni ........................... 701/48 |
| 2003/0029662 A1 | 2/2003 | Piech |
| 2005/0080530 A1 * | 4/2005 | Arduc et al. .................... 701/37 |

FOREIGN PATENT DOCUMENTS

| DE | 19923708 | 11/2000 |
| DE | 10352212 | 2/2005 |
| DE | 102008028266 | 9/2009 |
| JP | 2007062447 | 3/2007 |
| WO | 0071370 | 11/2000 |

OTHER PUBLICATIONS

Search Report for Italian application Serial No. BO20100351, Ministero dello Sviluppo Economico, Feb. 4, 2011, pp. 2.

* cited by examiner

*Primary Examiner* — Khoi Tran
*Assistant Examiner* — Ryan Rink
(74) *Attorney, Agent, or Firm* — Graybeal Jackson LLP

(57) ABSTRACT

An embodiment of a method of controlling a road vehicle having a number of wheels; a frame housing a passenger compartment; and a number of suspensions suspending the frame from respective wheels, and expandable or contractable to adjust the height of the frame with respect to the ground; the method including the steps of: determining a collision; and raising the frame with respect to the ground by expanding at least some of the suspensions on determining a collision.

11 Claims, 4 Drawing Sheets

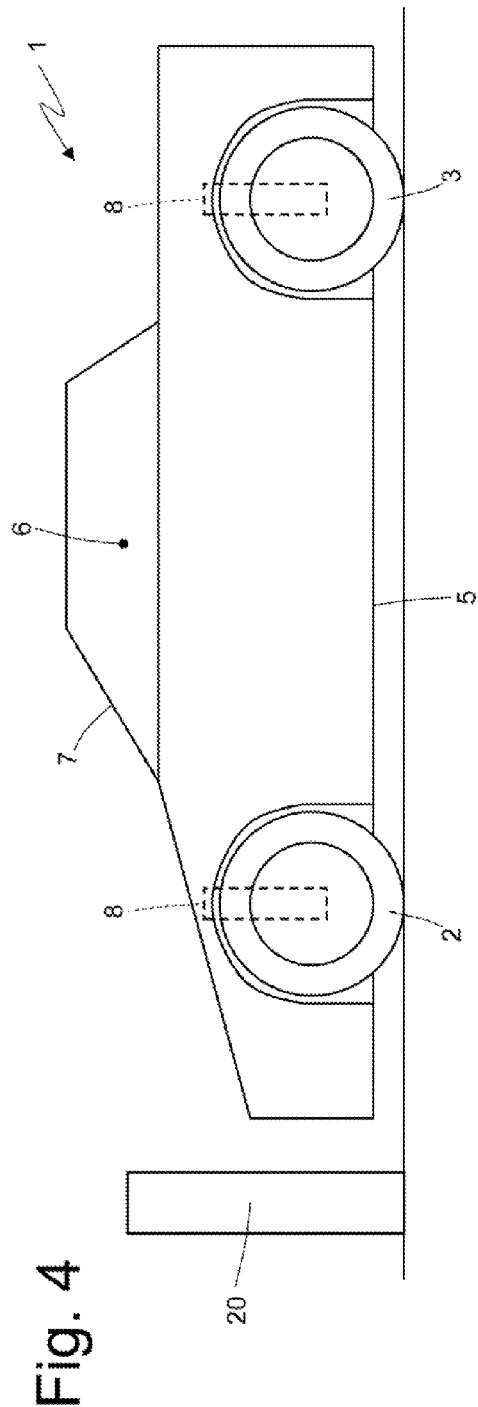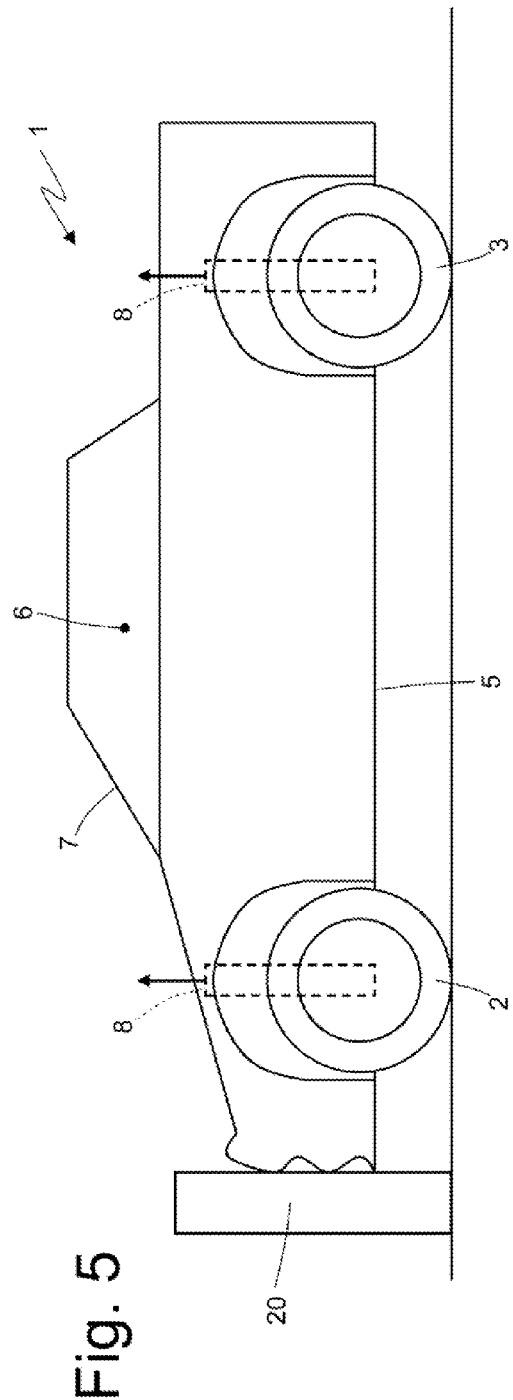

ROAD VEHICLE CRASH CONTROL METHOD, AND ROAD VEHICLE IMPLEMENTING SUCH A CONTROL METHOD

PRIORITY CLAIM

The instant application claims priority to Italian Patent Application No. BO2010A000351, filed Jun. 7, 2010, which application is incorporated herein by reference in its entirety.

TECHNICAL FIELD

An embodiment relates to a road vehicle crash control method, and road vehicle implementing such a control method.

An embodiment may be used to advantage on sports cars, to which the following description refers purely by way of example.

BACKGROUND

To reduce the size of the front end (and therefore drag) of a sports car to achieve a racing car design and reduce overall mass, the passenger compartment is typically made as small as possible, while at the same time ensuring at least a reasonable degree of comfort and, above all, adequate safety of the occupants in the event of a crash. Conformance with accident safety standards is what normally determines the extent to which the size of the passenger compartment can be reduced, i.e. the most rigid structural parts of the frame are kept as far away as possible from the occupants (in particular, the occupants' heads) to prevent the occupants from striking them in the event of a crash.

Safety standards in the United States (and many other countries, such as Canada and South Korea) require crash testing using instrumented, unrestrained crash dummies (i.e. with no seat belts). In a head-on collision with no seat belt, the occupant is literally hurled towards the front of the car, and is slowed down by the front airbag and the retaining action of the dashboard and seat. The trajectory of the occupant's head as he is hurled forward is one of the main factors governing the design of sports car passenger compartments, by including a horizontal forward component, and an upward vertical component. Which means a cramped (particularly, low-roofed) passenger compartment increases the likelihood of the occupant's head fatally striking the top windscreen cross member (which is a structural and therefore rigid component part of the frame).

At present, the only way of preventing the occupant's head from striking the top windscreen cross member in the event of an unrestrained head-on crash is to increase the vertical distance between the occupant's head and the cross member, i.e. the height of the passenger compartment roof (thus increasing the size of the passenger compartment, in contrast to the above design targets), or to lower (and so reduce the comfort of) the front seat.

Patent Applications WO0071370A1 and US2005080530A1, which are incorporated by reference, describe a road vehicle, in which, to protect the occupants in the event of a crash, the position of the frame with respect to the ground is altered by expanding or contracting the suspensions suspending the frame from the wheels.

SUMMARY

An embodiment is a road vehicle crash control method, and road vehicle implementing such a control method, designed to eliminate the above drawbacks, and which at the same time are cheap and easy to implement.

BRIEF DESCRIPTION OF THE DRAWINGS

One or more non-limiting embodiments will be described by way of example with reference to the accompanying drawings, in which:

FIGS. 4 and 5 show schematic side views of the FIG. 1 road vehicle before and after a head-on collision respectively.

DETAILED DESCRIPTION

Figure 1:
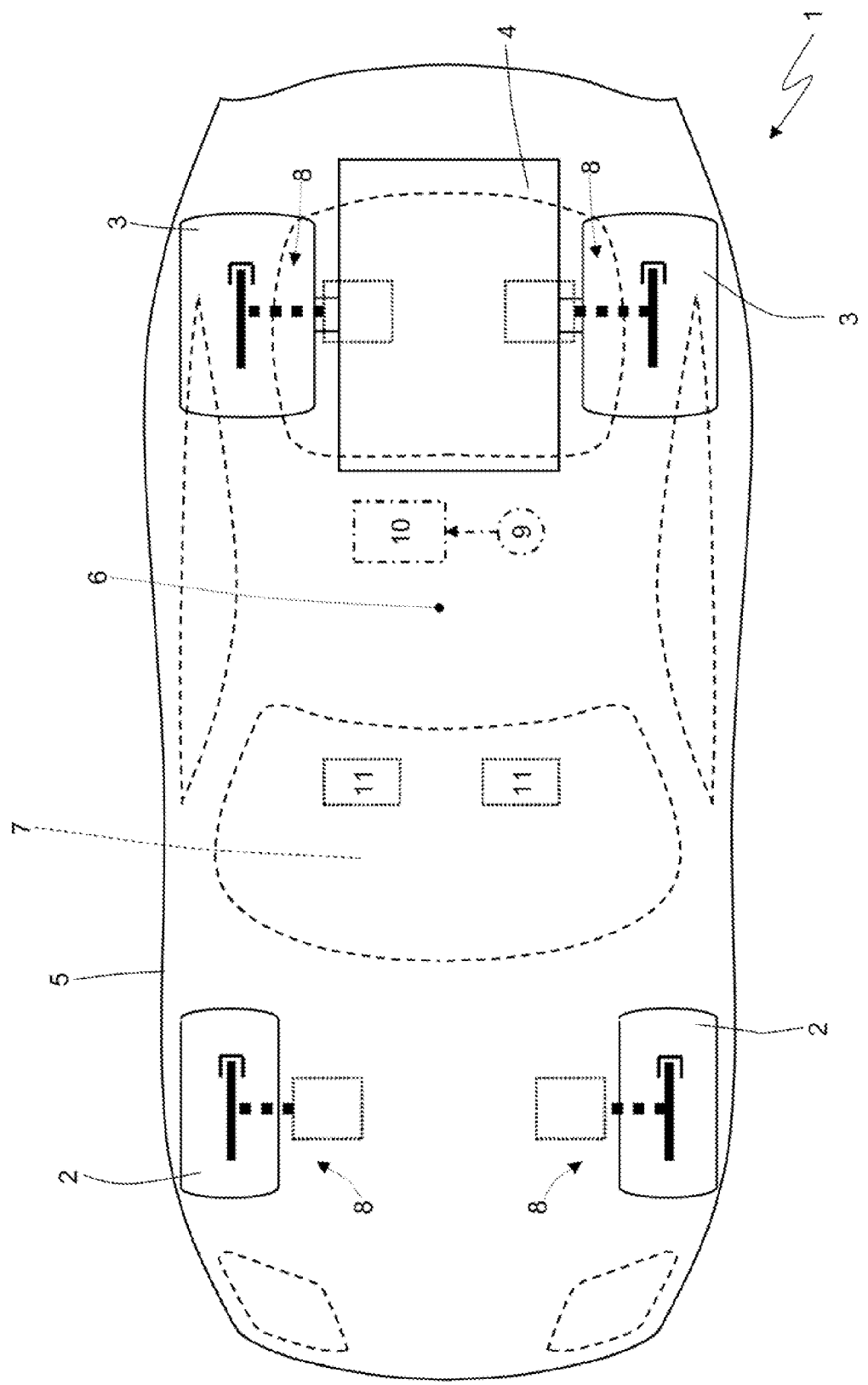
FIG. 1 shows a schematic of a road vehicle implementing a control method according to an embodiment.

Number 1 in FIG. 1 indicates as a whole an embodiment of a road vehicle including two front wheels 2; and two rear drive wheels 3 powered by a rear internal combustion engine 4.

Road vehicle 1 includes a frame 5 housing a central passenger compartment 6 bounded at the front by a windscreen 7 and for housing a driver and one passenger; four adjustable suspensions 8 suspending frame 5 from wheels 2 and 3, and expandable or contractable to adjust the height of frame 5 with respect to the ground; at least one crash sensor 9 typically defined by an accelerometer, and which records a crash when deceleration of road vehicle 1 exceeds a given threshold value; and a control unit 10, which receives a signal from crash sensor 9 and, in the event of a relatively severe head-on collision, activates front airbags 11 in passenger compartment 6.

Figure 2:
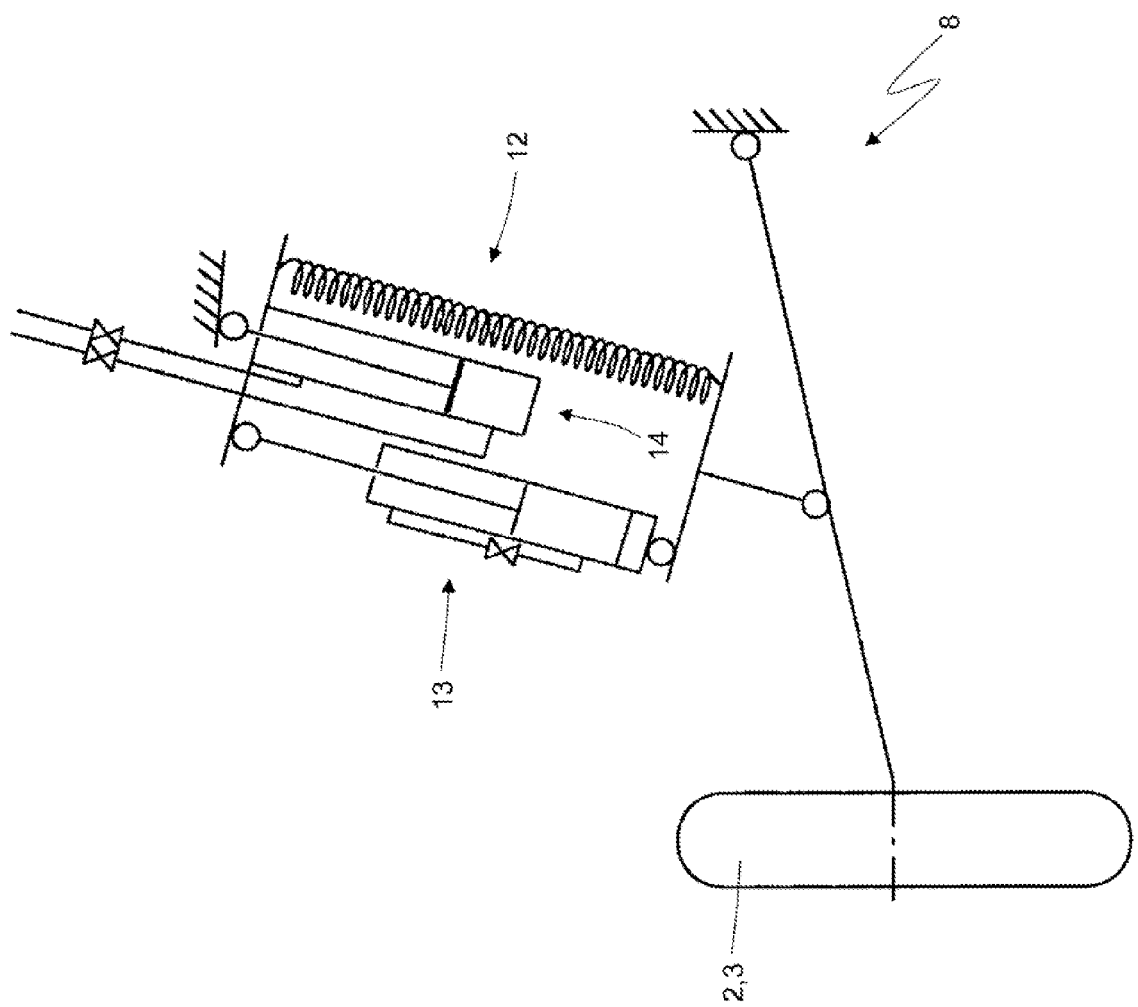
FIG. 2 shows a schematic of a suspension of the FIG. 1 road vehicle.
Figure 3:
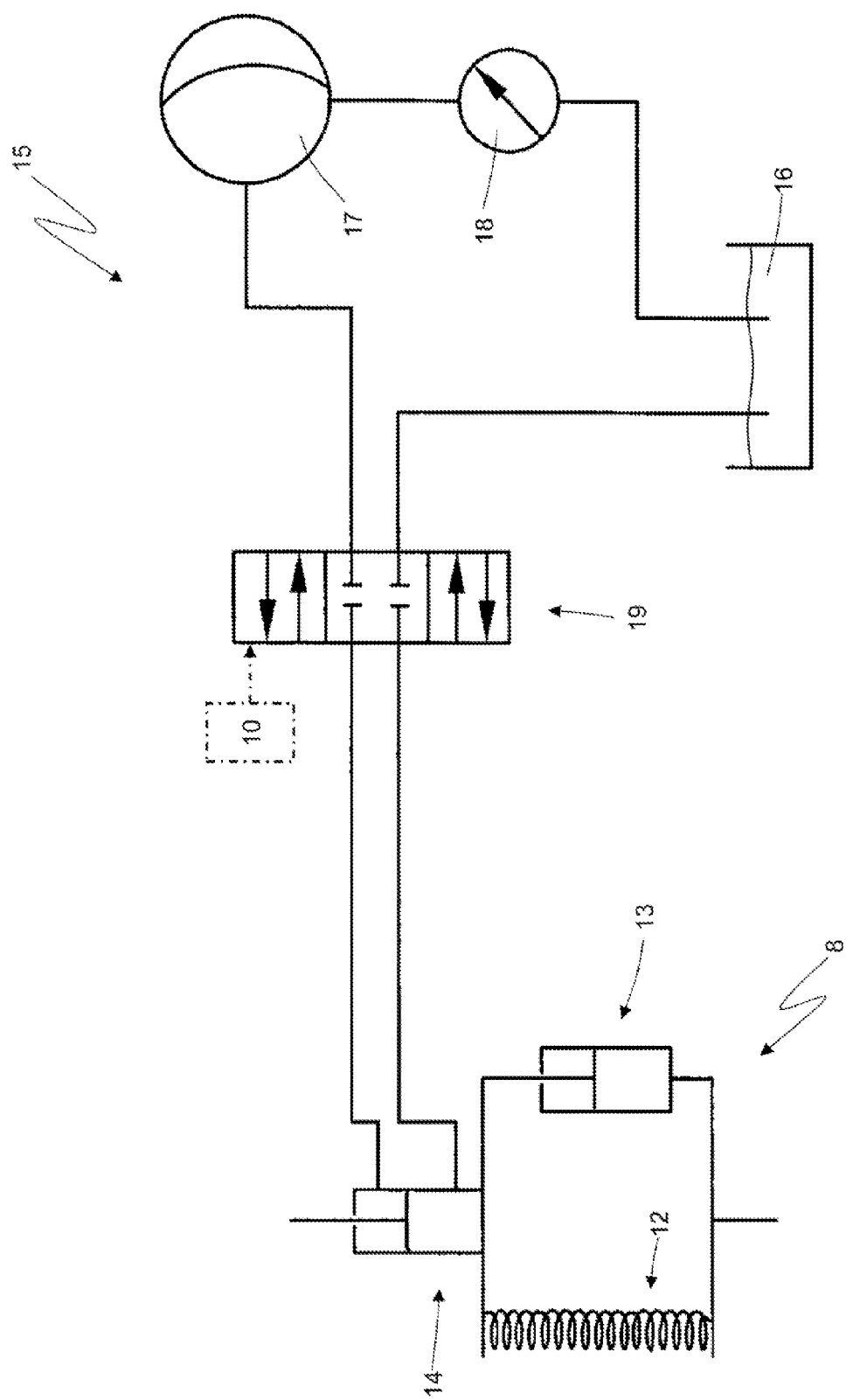
FIG. 3 shows a schematic of a hydraulic circuit connected to the FIG. 2 suspension.

As shown in FIG. 2, each suspension 8 comprises an elastic member 12 (typically a spring); a hydraulic shock-absorber 13; and a hydraulic actuator 14 controlled to expand or contract, and so expand or contract suspension 8, to adjust the height of frame 5 with respect to the ground. As shown in FIG. 3, hydraulic actuator 14 of each suspension 8 is operated by a hydraulic circuit 15 including a tank 16 of low-pressure (normally ambient-pressure) oil; and a storage tank 17 containing high-pressure oil and maintained under pressure by a pump 18 that draws directly from tank 16. For the hydraulic actuator 14 of each suspension 8, hydraulic circuit 15 includes a servocontrolled slide valve 19 for selectively isolating the two chambers of hydraulic actuator 14 to maintain a constant position of hydraulic actuator 14 (and therefore of suspension 8), or for connecting the two chambers of hydraulic actuator 14 respectively to tank 16 and storage tank 17 or vice versa, to adjust the position of hydraulic actuator 14 (and therefore of suspension 8).

Control unit 10, which receives the signal from crash sensor 9 and, in the event of a relatively severe head-on collision, activates front airbags 11 in passenger compartment 6, is also connected (directly or indirectly) to slide valve 19 of hydraulic circuit 15 to control hydraulic actuators 14 of suspensions 8 and so control the height of frame 5 of road vehicle 1 with respect to the ground. In the event of a (normally, but not necessarily) head-on collision, control unit 10 raises frame 5 with respect to the ground by expanding at least some of suspensions 8. In an embodiment, this is done using the same control used to activate front airbags 11 in passenger compartment 6.

This operating mode is shown in FIGS. 4 and 5, which show frame 5 closer to the ground just before a head-on collision with obstacle 20 (FIG. 4), and much higher (i.e. raised) off the ground immediately after the head-on collision with obstacle 20 (FIG. 5).

To raise frame 5 with respect to the ground in the event of a crash, control unit 10 can either expand all four suspensions 8 (as shown in FIG. 5) or only some of them (normally only front suspensions 8). Expanding only front suspensions 8 is sufficient to raise the front end of road vehicle 1 housing the occupants in passenger compartment 6, has the advantage of reducing (i.e. halving) the 'hydraulic energy' required, and so enables a reduction in the size of storage tank 17 of hydraulic circuit 15, and therefore in overall size and weight.

In the event of an unrestrained head-on collision (i.e. in which the occupants of passenger compartment 6 are not strapped by seat belts to frame 5), the occupants are literally hurled towards the front of road vehicle 1, and are slowed down by front airbags 11 and the retaining action of the dashboard and seats. The trajectories of the occupants' heads as they are hurled forward include a horizontal component towards the front of road vehicle 1, and an upward vertical component. Which means a cramped (particularly, low-roofed) passenger compartment 6 increases the likelihood of the occupants' heads fatally striking the top cross member of windscreen 7 (which is a structural and therefore rigid component part of frame 5). Because the occupants, as they are hurled forward as described above, are detached from frame 5 (by not being strapped into their seats), raising frame 5 with respect to the ground upon head-on collision also raises frame 5 with respect to the occupants, and distances the roof of passenger compartment 6 (and therefore the top cross member of windscreen 7) from the occupants' heads, which are thus prevented from striking the top cross member of windscreen 7 (and, in the worst case scenario, only strike windscreen 7). Windscreen 7 being much less rigid, i.e. much more flexible, than the top cross member forming part of frame 5, impact of the occupant's head against windscreen 7 (which rarely happens) has far less serious consequences than similar impact against the top cross member of windscreen 7.

In other words, for a given unrestrained head-on collision with obstacle 20, not raising frame 5 with respect to the ground upon impact results in the occupant's head striking the top cross member of windscreen 7 (with potentially fatal consequences), whereas raising frame 5 with respect to the ground upon impact prevents the occupant's head from striking the top cross member of windscreen 7 (thus greatly improving occupant safety).

In an embodiment, raising frame 5 with respect to the ground is synchronized with the forward movement of the occupant produced by deceleration of road vehicle 1 following a head-on collision, to prevent the occupant's head from striking the top cross member of windscreen 7.

In an embodiment, control unit 10 determines whether or not the occupants' seat belts are fastened, and only raises frame 5 with respect to the ground, in the event of a head-on collision, if the occupants' seat belts are not fastened. When the seat belts are fastened, the occupants are secured to the seats and therefore to frame 5 (especially when pretensioning of the seat belts in the event of collision is provided for), so raising frame 5 upon collision would also raise the occupants and so serve no purpose. Moreover, when the seat belts are fastened (i.e. in the event of restrained collision), the restraining action of the seat belts prevents any possibility of the occupant's head striking the top cross member of windscreen 7 or windscreen 7 itself.

In an alternative embodiment, frame 5 may be raised with respect to the ground, in the event of a head-on collision, regardless of whether or not the seat belts are fastened. In which case, raising frame 5 with respect to the ground when the seat belts are fastened may be ineffective but at any rate typically does no harm.

The above description refers specifically to head-on collisions (i.e. collisions activating front airbags 11), but frame 5 may also be raised to advantage with respect to the ground in the event of lateral collisions (to prevent the occupant's head from striking the top cross member of the side window).

The above embodiments of a method of crash controlling road vehicle 1 may have numerous advantages.

In particular, an embodiment allows greater freedom in the design of road vehicle 1 in terms of the head trajectory of unrestrained occupants in the event of a head-on collision: an attractive racing car design can be achieved, to reduce drag (by reducing the size of the front end) and improve dynamic performance and fuel consumption (by reducing weight). Without an embodiment of a control method as described, the problem of preventing the occupant's head from striking the cross member of windscreen 7 may only be solved by increasing the height of the windscreen cross member at the design stage, thus increasing the size of the front end of road vehicle 1, with all the negative consequences this has on the design and performance of road vehicle 1 as a whole.

An embodiment of the control method described can also be installed cheaply on existing road vehicles 1, by requiring no specific additional hardware, and by simply making original use of normally existing hardware (the signal activating front airbags 11 in the event of collision, and adjustable suspensions 8).

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A road vehicle comprising:
a number of wheels;
a frame housing a passenger compartment;
a number of suspensions suspending the frame from respective wheels, and expandable or contractable to adjust the height of the frame with respect to the ground;
a crash sensor; and
a control unit, which is configured to receive a signal from the crash sensor, and is configured to control the suspensions to raise the frame with respect to the ground by expanding at least some of the suspensions on determining a collision, the control unit configured to synchronize raising of the frame with respect to the ground with the forward movement of the occupants of the passenger compartment produced by collision-induced deceleration of the road vehicle.

2. A road vehicle as claimed in claim 1,
wherein:
the passenger compartment is provided with front airbags; and
the control unit is configured to trigger the front airbags using a command signal and is also configured to raise the frame with respect to the ground upon collision, using the same command signal used to activate the front airbags of the passenger compartment.

3. A road vehicle as claimed in claim 1, wherein the control unit is configured to raise the frame with respect to the ground by expanding at least some of the suspensions on determining a head-on collision.

4. A road vehicle as claimed in claim 1, wherein:
the passenger compartment is provided with seat belts;
   the control unit is configured to determine whether or not the seat belts of the occupants of the passenger compartment are fastened; and
   the control unit is configured to not raise the frame with respect to the ground upon collision, when the seat belts of the occupants of the passenger compartment are fastened.

5. A road vehicle comprising:
a number of wheels;
a frame housing a passenger compartment provided with front airbags;
a number of suspensions suspending the frame from respective wheels, and expandable or contractible to adjust the height of the frame with respect to the ground;
a crash sensor; and
a control unit, which is configured to receive a signal from the crash sensor, and configured to control the suspensions to raise the frame with respect to the ground by expanding at least some of the suspensions on determining a collision, configured to trigger the front airbags using a command signal, and also configured to raise the frame with respect to the ground upon collision, using the same command signal used to activate the front airbags of the passenger compartment, and also configured to raise the frame with respect to the ground by expanding at least some of the suspensions only on determining a head-on collision.

6. A road vehicle as claimed in claim 5, wherein:
the passenger compartment is provided with seat belts;
   the control unit is configured to determine whether or not the seat belts of the occupants of the passenger compartment are fastened; and
   the control unit is configured to not raise the frame with respect to the ground upon collision, when the seat belts of the occupants of the passenger compartment are fastened.

7. A road vehicle as claimed in claim 5, wherein the control unit is configured to synchronize raising of the frame with respect to the ground with the forward movement of the occupants of the passenger compartment produced by collision-induced deceleration of the road vehicle.

8. A road vehicle comprising:
a number of wheels;
a frame housing a passenger compartment provided with seat belts;
a number of suspensions suspending the frame from respective wheels, and the suspensions being expandable or contractable to adjust the height of the frame with respect to the ground;
a crash sensor; and
a control unit, which is configured to receive a signal from the crash sensor, and configured to control the suspensions to raise the frame with respect to the ground by expanding at least some of the suspensions on determining a collision;
the control unit configured to determine whether or not the seat belts of the occupants of the passenger compartment are fastened; and configured to not raise the frame with respect to the ground upon collision, when the seat belts of the occupants of the passenger compartment are fastened.

9. A road vehicle as claimed in claim 8, wherein:
   the passenger compartment is provided with air bags; and the control unit is configured to trigger the front airbags using a command signal and is also configured to raise the frame with respect to the ground upon collision, using the same command signal used to activate the front airbags of the passenger compartment.

10. A road vehicle as claimed in claim 8, wherein the control unit is configured to raise the frame with respect to the ground by expanding at least some of the suspensions on determining a head-on collision.

11. A road vehicle as claimed in claim 8, wherein the control unit is configured to synchronize raising of the frame with respect to the ground with the forward movement of the occupants of the passenger compartment produced by collision-induced deceleration of the road vehicle.

* * * * *